United States Patent [19]
Sarma et al.

[11] Patent Number: 5,684,978
[45] Date of Patent: Nov. 4, 1997

[54] SYNCHRONOUS DRAM CONTROLLER WITH MEMORY ACCESS COMMANDS TIMED FOR OPTIMIZED USE OF DATA BUS

[75] Inventors: Sudha Sarma, Tucson, Ariz.; Adalberto Guillermo Yanes, Sunnyvale, Calif.

[73] Assignee: International Business Machines Corporation, Armonk, N.Y.

[21] Appl. No.: 545,975

[22] Filed: Oct. 20, 1995

[51] Int. Cl.$^6$ .................................................. G06F 13/14
[52] U.S. Cl. ........................ 395/496; 395/432; 395/433
[58] Field of Search .............................. 365/194, 230.03, 365/233; 395/475, 494, 496, 432, 551, 552, 557, 433

[56] References Cited

U.S. PATENT DOCUMENTS

| | | | |
|---|---|---|---|
| 4,323,965 | 4/1982 | Johnson et al. | 395/484 |
| 4,376,972 | 3/1983 | Johnson et al. | 395/411 |
| 5,263,003 | 11/1993 | Cowles et al. | 365/230.03 |
| 5,384,745 | 1/1995 | Konishi et al. | 365/230.03 |
| 5,539,696 | 6/1996 | Patel | 365/189 |
| 5,560,000 | 9/1996 | Vogley | 395/556 |
| 5,598,374 | 1/1997 | Rao | 365/230.03 |
| 5,600,605 | 2/1997 | Schaefer | 365/233 |

OTHER PUBLICATIONS

Jones, Fred et al. "A New Era of Fast Dynamic RAMs", IEEE Spectrum, pp. 43–49, Oct. 1992.
Takai, Yasuhiro et al. "250 Mbyte/s Synchronous DRAM Using a 3-Stage-Pipelined Architecture", IEEE Journal of Solid-State Circuits, pp. 426–431, Apr. 1994.
Sunaga, Toshio et al. "A Full Bit Prefetch Architecture for Synchronous DRAM's", IEEE Journal of Solid-State Circuits, pp. 998–1005, Sep. 1995.

*Primary Examiner*—Tod R. Swann
*Assistant Examiner*—Conley B. King, Jr.
*Attorney, Agent, or Firm*—Baker, Maxham, Jester & Meador

[57] ABSTRACT

For an synchronous dynamic access memory ("S-DRAM") system including a memory assembly with multiple memory units, data access commands are placed on a command bus at specific times to facilitate gapless data bus operation. After receipt of a first memory access request, a first memory access command is issued on the command bus to exchange a first data string having a first length with a first one of the memory units. Subsequently, receipt occurs of a second memory access request is to exchange a second data string, of a second length, with a second one of the memory units. A determination is made of an earliest possible time for placement of a second memory access command upon the command bus; this considers various factors, such as the first length, data bus availability, command bus availability, and any predetermined delay in placement of the first data string onto the data bus. Accordingly, the second memory access command is placed upon the command bus at the determined time. After the first data string leaves the data bus, any exchange of data between the first memory unit and the data bus may be prevented for a predetermined time.

37 Claims, 9 Drawing Sheets

READ-READ

READ-WRITE

WRITE-WRITE

WRITE-READ

SYNCHRONOUS DRAM CONTROLLER WITH MEMORY ACCESS COMMANDS TIMED FOR OPTIMIZED USE OF DATA BUS

BACKGROUND OF THE INVENTION

1. Field of the Invention

The present invention relates to the access of data from synchronous DRAM. More particularly, the invention concerns a method and apparatus providing data access commands on a synchronous DRAM command bus at appropriate times to facilitate gapless data bus operation.

2. Description of the Related Art

DEVELOPMENT AND OPERATION OF SYNCHRONOUS DRAM

Developments in processor speed have increased at a much faster pace than developments in memory speed. As a result memory access can be a performance-limiting factor in many systems. This is particularly true of volatile memories that require several maintenance functions such as refresh and precharge to function effectively.

Traditionally, DRAM is "asynchronous", meaning that it operates at a clock rate independent of the clock used by the system processor. In a typical environment, the processor reads or writes data to the DRAM by sending addresses and control signals to the DRAM. Then, the processor waits for the appropriate delay time for the DRAM to perform the requested action; this is called the DRAM's "access time." This delay is needed for the DRAM to perform tasks such as activating word and bit lines, sensing data, and routing data to output buffers.

A number of techniques have been used to speed up the operation of DRAM. For instance, "fast-access" modes, such as page, static-column, and nibble modes have been used to significantly increase DRAM performance. Features such as "enhanced DRAM" and "RAM busses" have also been used.

One of the newest and most significant improvements in memory access speed is synchronous DRAM ("S-DRAM"). S-DRAM differs from non-synchronous DRAM by operating under synchronization with a central clock, and employing a fast cache-memory to hold the most commonly used data. Where DRAM might supply data during alternate clock cycles in some applications, "S-DRAM" can supply data during successive clock signals. Hence, S-DRAM provides significantly increased memory "bandwidth", referring to the speed at which information can be exchanged with memory. Typically expressed in megabytes per second, memory bandwidth is a product of the rate of data transfer and the amount of data in each transfer operation.

TYPICAL S-DRAM CONFIGURATION

A typical implementation of S-DRAM is illustrated in FIG. 1. The S-DRAM includes a memory cell array 100, which is divided into columns and rows of memory elements. An individual element of the memory cell array 100 is accessed when an address decoder 102 selects a specific row address and columns address of the desired memory location. The input to the address decoder 102 is a memory address, which it receives from a clocked address input unit 106. If desired, the address input may be multiplexed, enabling both the row and column addresses to be carried on the same signal lines. The selection of row and column addresses are controlled by a Row Address Strobe ("RAS") and a Column Address Strobe ("CAS"), respectively. The address decoder 102 decodes the row and column addresses it receives, and appropriately selects one or more memory cells in the memory cell array 100.

Data retrieved from the memory cell array 100 is provided to an output buffer 108 via a latch 110, under control of a clock signal provided by a user-supplied clock circuit 112. The user-supplied clock circuit 112 is used to clock the writing of data from an input buffer 111 into the memory cell array 100 via the latch 110, while memory addresses are being supplied by the address decoder 102. As determined by a Read/Write ("R/W") signal 113, the latch 110 may be responsive, in both Read and Write operations, to the clock signal's rising edge.

DRAWBACKS OF KNOWN SYNCHRONOUS DRAM IMPLEMENTATIONS

Difficulty in Reading, Due to Skew

Despite the improved bandwidth of S-DRAM, it can still be difficult to implement. One of the most sensitive operations of a S-DRAM circuit is the sampling of data on a Read cycle. S-DRAM circuits typically have a certain window of time where data read from the memory is valid. Data is ultimately read in response to a system clock which coordinates the timing of a Read command issued to the memory; the Read command is received in the form of RAS, CAS, clock, and memory address signals. Hence, some time after issuance of the Read command, the S-DRAM makes the desired data available, and keeps it available for a certain period. This period is called the "data valid window," and its delay with respect to the system clock is called "skew."

Due to concerns with the data valid window, S-DRAM can be difficult to implement. For example, changing the memory loading by reducing or increasing the number of single in-line memory modules ("SIMMs") changes the skew of the data valid window. As a result, it is difficult for a single memory controller to successfully read data from a bank of S-DRAM that may change in size from time to time. For example, if more SIMMs are added, the memory controller will have to account for the increased skew in order to successfully read data at the appropriate time.

Data skew is influenced by a number of factors, such as "speed sort" and memory "loading." In this regard, one technique that addresses these limitations is disclosed in U.S. patent application Ser. No. 08/367,514 (now U.S. Pat. No. 5,577,326), entitled "Memory Controller for Reading Data from Asynchronous Synchronous DRAM", filed on Dec. 30, 1994, in the names of Johnson et al., and assigned to IBM Corporation.

Data Bus Availability

Other potential problems with known S-DRAM may occur as a result of high contention for the data bus by multiple different memory operations. Namely, the data bus only carries data for one memory operation at a time. Therefore, if one Read command is issued while the data bus is carrying data requested by another Read command, the later Read command cannot receive its data until the data bus completely transfers the earlier Read command's data. Similarly, if one Write command is issued while the data bus is carrying data requested by a Read command, the Write command cannot place its data on the data bus until the data bus completely transfers the Read command's data.

A certain amount of delay usually occurs between adjacent data groups transferred on the data bus. This delay is referred to as a "gap." Gaps result from the specific way in which the controller processes Read and Write commands, the time needed to place data onto the data bus in response to a Read command, intervals needed to prevent inadvertent concurrent use of the data bus, and the like.

In this regard, the memory operates most efficiently (by delivering its maximum bandwidth) when it accesses relatively long sets of sequentially located words. In this situation, there are minimal gaps between sequential groups of data on the data bus. The memory's performance, however, degrades considerably when accessing non-sequential words.

SUMMARY OF THE INVENTION

Broadly, the invention concerns a method and apparatus to exchange data between an S-DRAM assembly of multiple memory units, where data access commands are placed on a command bus at appropriate times to facilitate "gapless" data bus operation. Each memory access command is placed upon the command bus at a calculated time prior to the data bus's completion of its previous operation. The ability to delay maintenance functions such as precharge also helps to minimize the gaps on the data bus.

After receipt of a first memory access request, a first memory access command is issued on the command bus to exchange a first data string having a first length with a first memory unit. The first command may comprise, for example, a Read or Write command. Subsequently, receipt occurs of a second memory access request to exchange a second data string, of a second length, with a second memory unit.

Then, a determination is made of an earliest possible time for placement of a second memory access command upon the command bus. This determination considers various factors, such as the first string's length, data bus availability, command bus availability, and any predetermined delay in placement of the first data string onto the data bus. Accordingly, the second memory access command is placed upon the command bus at the determined time. As a result, the second string is placed upon the data bus as soon as possible after the first string leaves the data bus. Moreover, when the first data string leaves the data bus, any exchange of data between the first memory module and the data bus may be masked for a predetermined time to prevent any inadvertent data bus conflict.

The present invention provides its users with a number of distinct advantages. For example, the invention optimizes use of a data bus of an S-DRAM system by reducing "gaps" between successive groups of data transferred over the data bus. This is especially effective when accesses involve memory addresses of separate memory units, or memory addresses that are not sequentially located.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Figure 1:
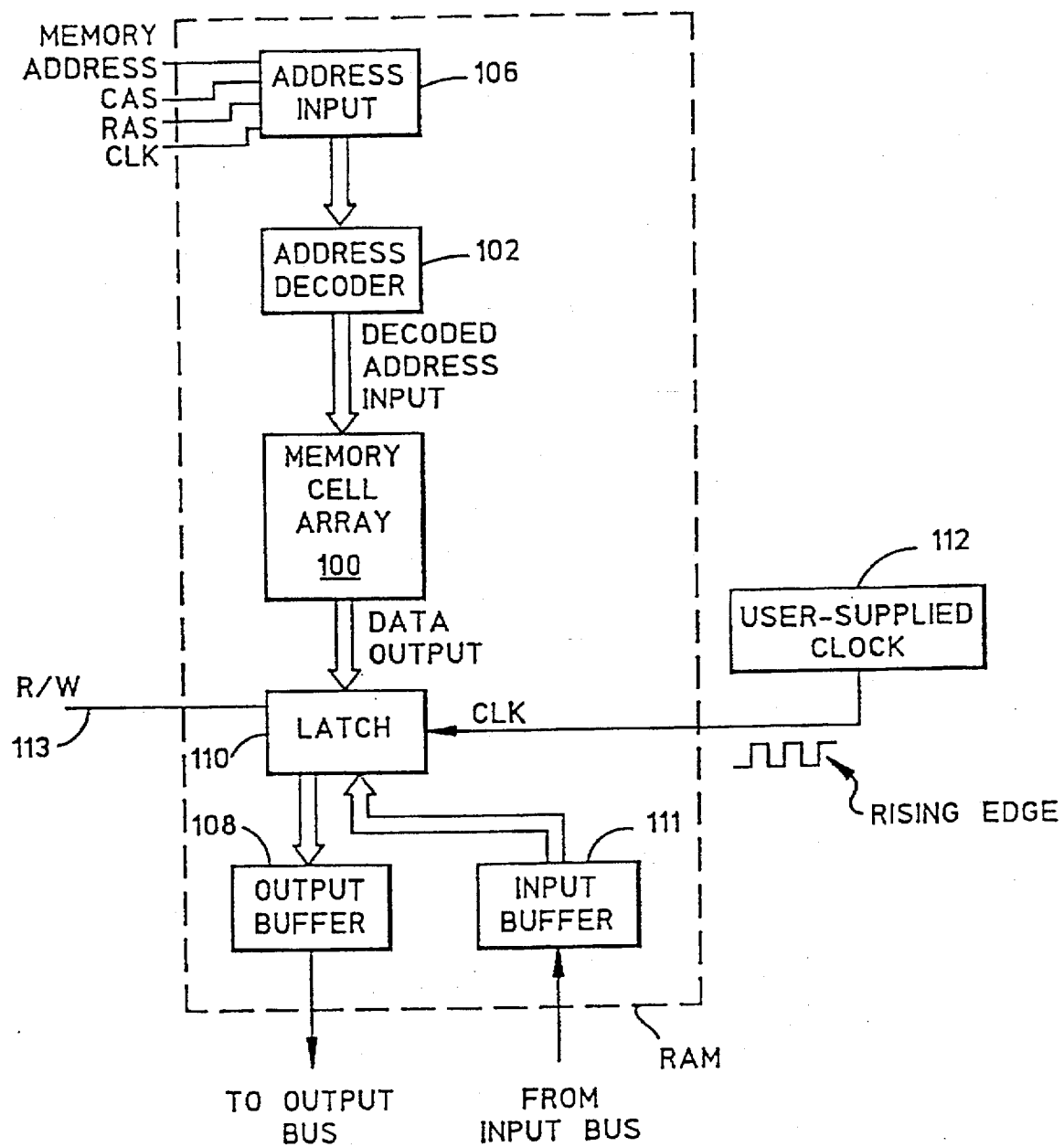
FIG. 1 is a block diagram illustrating a typical application of S-DRAM.
Figure 2:
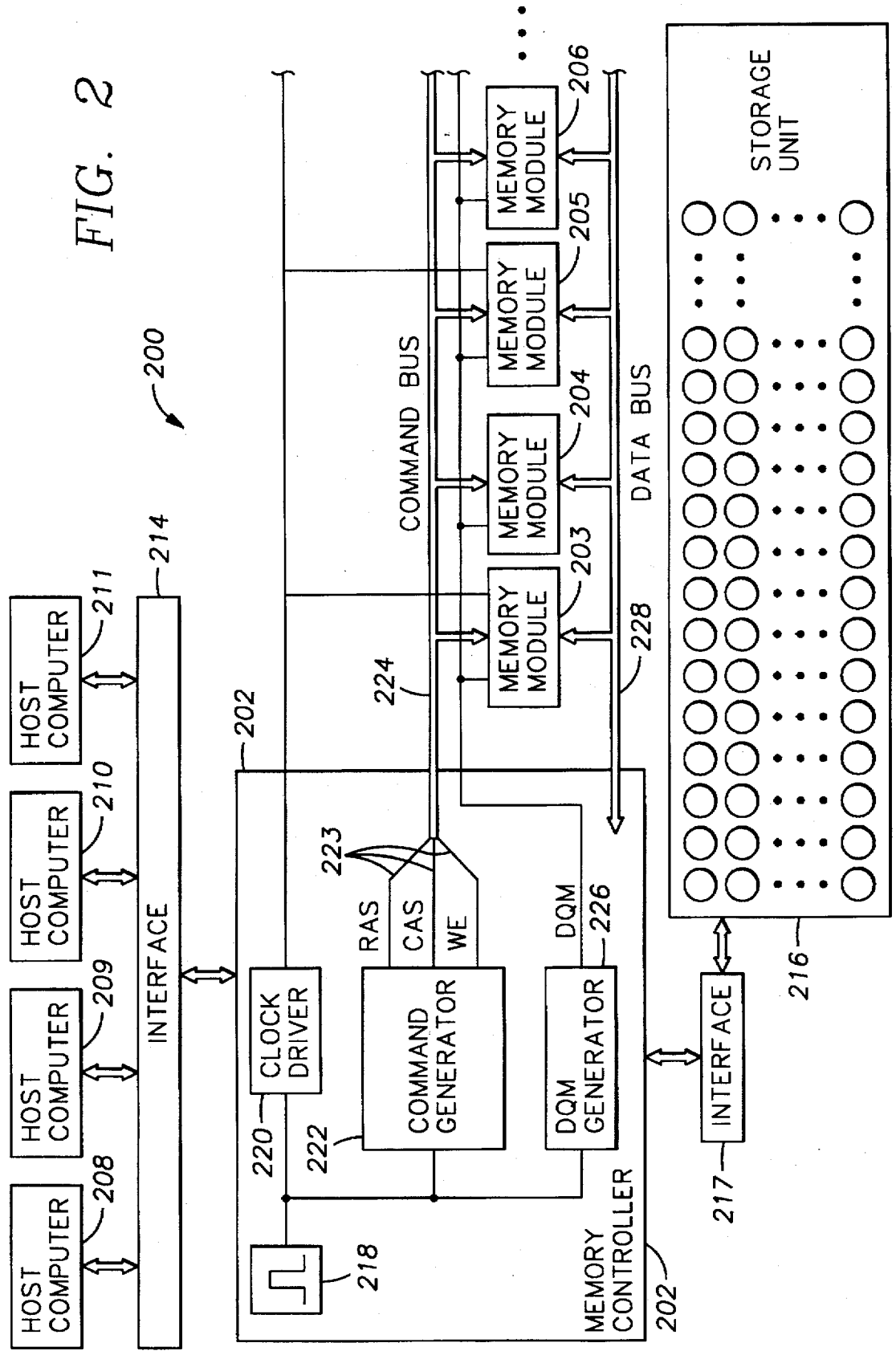
FIG. 2 is a block diagram of the hardware components and interconnections of one implementation of the invention.

FIG. 2 illustrates the hardware components and interconnections of a storage system 200 to illustrate one application of the invention. Primarily, the system 200 includes a memory controller 202 and an S-DRAM assembly of one or more memory units 203–206 (also called "modules"). The system 200 also includes one or more host computers 208–211 interconnected with the controller 202 by an interface 214. The host computers 208–211 may comprise, for example (1) an RS6000 machine 208, (2) a mainframe computer 209 such as an IBM S/390, (3) a personal computer 210, and (4) a server 211 such as Sun or Silicon Graphics mini-computer. The interface 214 may comprise a PCI bus, for example.

The system 200 may also include a non-volatile memory storage unit 216 such as a RAID storage array. The storage unit 216 may interconnect to the controller 202 via an interface 217, such as an SCSI interface. In the illustrated example, the controller 202 may operate to exchange data between the storage unit 216 and the host computers 208–211, with the memory modules 203–206 serving to cache the most frequently-accessed data.

The controller 202 includes a clock driver 220, electrically interposed between a system clock 218 and the memory units 203–206. The driver 220 adds sufficient current to the low-current system clock signal to drive the higher-current requirements of the memory units 203–206, thereby timing the internal operations of the units 203–206.

Also included in the controller 202 is a command generator 222, which is coupled to the system clock 218. The command generator 222 generates multiple command outputs 223 that may, for example, include RAS, CAS, and WE outputs as illustrated. The command generator 222 provides its outputs 223 to a command bus 224, which is attached to each of the memory units 203–206 in addition to the command generator 222. The controller 202 also includes a data queue mask ("DQM") generator 226, electrically connected to the memory units 203–206.

The memory units 203–206 exchange data with the controller 202 over a data bus 228. In the illustrated example, the data bus 228 comprises a 32 bit (4 byte) bus.

Operation

General Description

Figure 3:
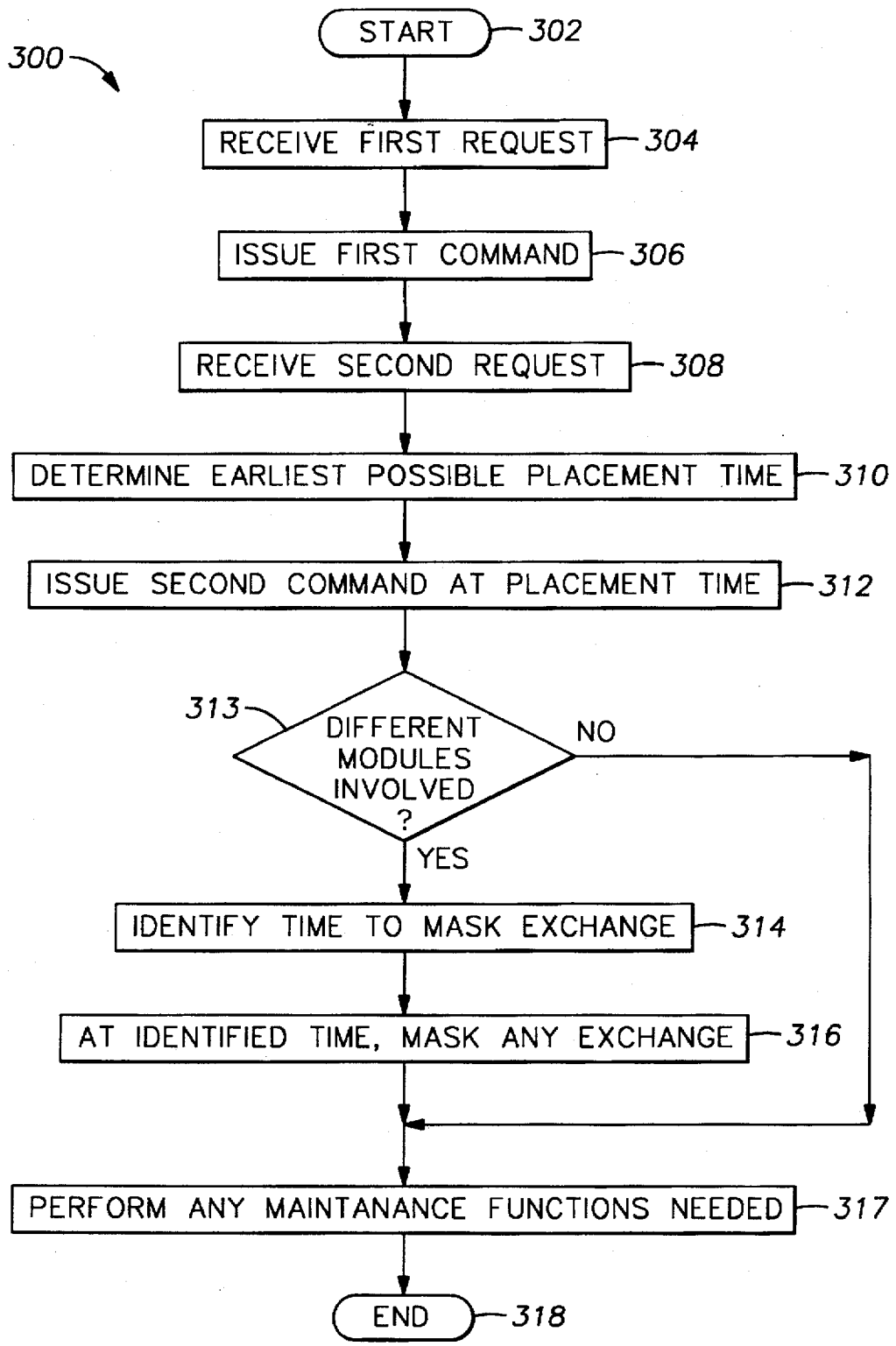
FIG. 3 is a general flowchart of a memory access process, in accordance with the invention.

FIG. 3 depicts a storage sequence 300 to broadly illustrate an exemplary embodiment of the process aspect of the invention. As an example of the invention, the routine 300 illustrates the issuance of a second memory access command and its relationship to an earlier, first memory access command. For ease of illustration, the routine 300 is discussed in the context of the hardware of FIG. 2.

After the routine 300 starts in task 302, the controller 202 receives a first memory access request in task 304. The first memory access request comprises, for example, a request to Read data from one of the modules 203–206 or to Write data thereto. In the illustrated embodiment, this memory access command is received from one of the host computers 208–211 via the interface 214. In task 306, the controller 202 issues a first memory access command by placing the command upon the command bus 224.

Subsequently, the controller 202 receives a second memory access request in task 308. It is understood, however, that the second memory access request may be received at various other times, such as prior to issuance of the first memory access command on the command bus, or even prior to placement of the first data string upon the data bus. The second memory access request comprises a Read/Write request, emanating from one of the host computers 208–211. Although the command bus 224 may already be free from any remnants of the first memory access command, the data bus 228 may still be involved in transferring data in response to the first memory access command. Therefore, task 310 determines the earliest possible time at which a second memory access command, corresponding to the second memory access request, can be placed upon the command bus 224. This determination involves a consideration of various factors, such as the way in which the controller 202 and memory modules 203–206 process Read and Write commands, the avoidance of command and data bus conflict, the number of clock cycles of delay occurring between issuance of a Read command and placement of the requested data on the data bus 228 (if either memory access command is a Read command), and the like.

Having made this determination, the controller 202 in task 312 issues the second memory access command at the calculated time by placing the command upon the command bus 224.

Query 313 then asks whether different memory modules 203–206 are involved in the first and second memory accesses. If true, certain measures may help avoid any potential conflict on the data bus 228 between the two memory requests. One of the problems which introduces gaps has to do with maintenance functions which must follow a Read or Write access command. To eliminate these gaps in the event different modules are involved, the controller 202 in task 314 identifies an appropriate time to prevent any exchange of data between the data bus 228 and the memory module 203–206 involved in the first memory access. This time, as discussed in greater detail below, is calculated to occur precisely at the conclusion of the first memory access operation. At the calculated time, the controller 202 in task 316 masks the exchange by triggering the data DQM line of the memory module 203–206 involved in the first memory access operation. In the illustrated embodiment, this is performed by the DQM generator 226.

After task 316, or alternatively after query 313, the system performs maintenance functions shown in task 317. After this, the routine 300 terminates in task 318.

More Specific Description

Figure 4A:
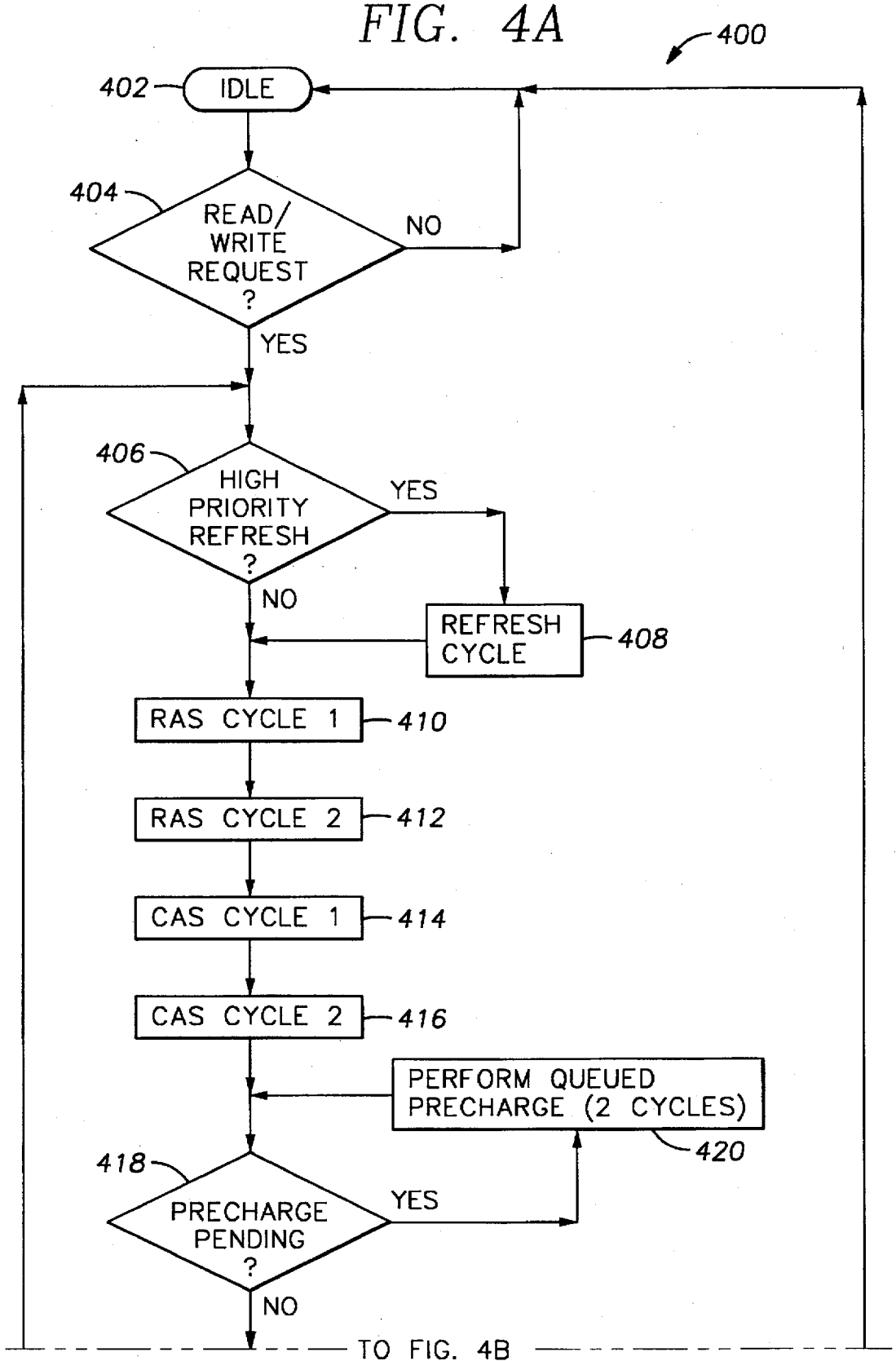
FIGS. 4A–4B depict a more detailed flowchart of a memory access process, in accordance with the invention.
Figure 4B:
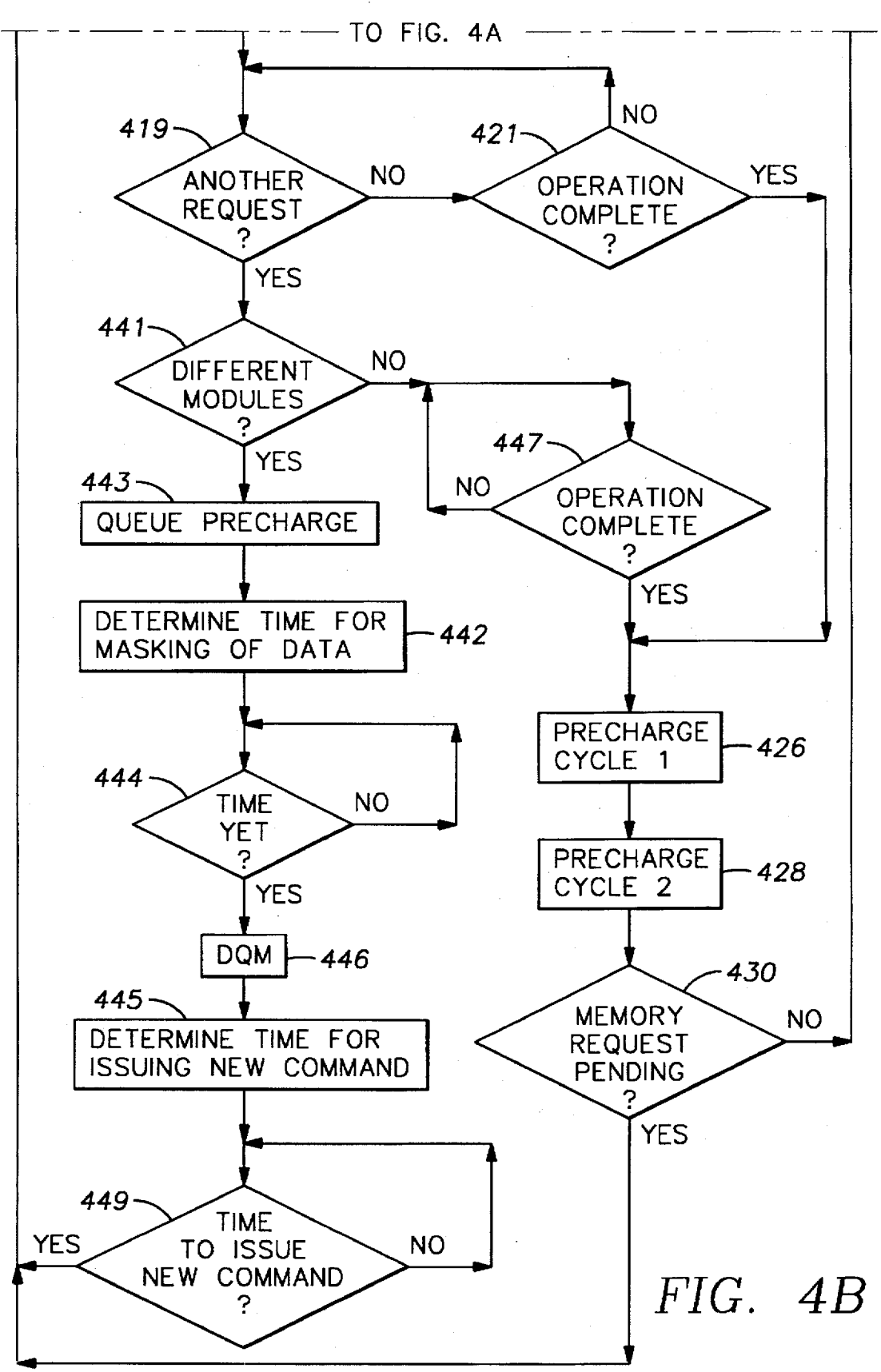

FIG. 4 depicts a storage sequence 400 that illustrates a more specific example of the process aspect of the invention. With reference to FIG. 4, the following description illustrates the complete sequence involved in issuance of a first memory access command, and the progression to issuance of a second, subsequent memory access command. For ease of illustration, the routine 400 is discussed in the context of the hardware of FIG. 2.

Preferably, the controller 202 executes the routine 400 by using circuitry (not shown) contained in the controller 202, such as an application-specific integrated circuit ("ASIC") or VLSI logic devices embodied in a multiplicity of CMOS or TTL devices. Alternatively, the controller 202 may perform the mapping process by executing a series of microcode or other computer-readable instructions contained on a data storage medium (not shown), such as a computer diskette, DASD array, magnetic tape, conventional "hard disk drive", electronic read-only memory, optical storage device, set of paper "punch" cards, or another data storage device.

Referring to FIG. 4, unless the controller 202 receives a Read or Write request from the interface 214, the controller 202 remains in an "idle" state, shown by task 402. When query 404 detects receipt by the controller 202 of a memory access request, control advances to query 406, which asks whether a high priority refresh command has been received. In accordance with the invention, DRAM refresh commands where needed may be given "high priority" to establish their precedence over memory access operations. If a high priority refresh command has been received, the controller 202 in task 408 conducts a refresh of the memory modules 203–206. If the refresh request is not high priority, refreshing may be performed after the memory access command is issued.

After a negative answer to query 406, or alternatively after completion of task 408, the memory access request detected in query 404 is issued as a memory access command. Specifically, the RAS and CAS outputs 223 are triggered. In the illustrated embodiment, the RAS and CAS functions include two cycles each. The RAS cycles are performed in tasks 410 and 412 by placing appropriate signals on the RAS line of the output 223. Similarly, the CAS cycles are performed in tasks 414 and 416 by placing appropriate signals on the CAS line of the output 223.

After task 416, query 418 asks whether a precharge request is "pending", the meaning of which is described below. If so, the controller in task 420 performs the queued precharge in two cycles; as an example, the controller 202 may carry out the precharge operation by continuing to maintain activation of the RAS and WE lines for an additional two cycles. When no precharge is pending, query 418 directs control to query 419, which asks whether another memory access request is pending. If another memory access request is not pending, query 421 waits for the current memory operation to complete, then performs a two-cycle precharge operation in tasks 426 and 428, thus completing the operation. Then, query 430 asks whether another memory access request is pending. If so, control returns to query 406 for execution of the new memory access command; otherwise, control returns to the idle mode in task 402.

In contrast to the above description, if query 419 detects arrival of another memory access request, control progresses to query 441, which determines whether the previous memory access request (the "current" request) and the new memory access request (the "pending" request) seek access to different memory modules.

A. Standard Timing

As explained above, gapless data bus operation is possible when the current request and the pending request concern different memory modules. Therefore, when query 441 determines that the current and pending request concern the same memory module, expedited timing is not used. In this case, query 447 waits for the current memory operation to complete, and then tasks 426 and 428 perform a two-stage precharge operation.

B. Expedited Timing

On the other hand, if query 419 detects arrival of a new memory access request from a different memory module 203–206 than the current module, subsequent tasks are performed (if applicable) to coordinate expedited timing of the pending memory access operation. Generally, these tasks concern (1) providing precharge operations at appropriate times, (2) executing masking operations at appropriate times, and (3) initiating a new memory access command at the earliest possible time relative to the current memory access command.

1. Precharge Operations

Generally, a precharge operation is necessary to terminate a data cycle. The precharge command serves to de-activate the row and column being accessed in a memory module, thereby freeing that memory module for the next access. Therefore, if first and second memory access commands concern the same memory module, a precharge command must be issued after the first memory access command prior to the second. Accordingly, if query 441 determines that the current and pending memory access requests concern the same memory module, the routine 400 proceeds to perform a precharge operation (tasks 426 and 428) after each memory access command, i.e. after each RAS/CAS combination.

However, one of the advantages of expedited timing is that precharge commands may be "queued" in the case of different memory modules. Particularly, the present invention advantageously queues the precharge command normally required after a memory access command, when that command is followed by a memory access command pertaining to a different memory module. In this way, the command bus is freed during the interval between the two commands, permitting the second command to actually be issued sooner. However, the queued precharge command is still performed at a later time.

In the example of FIG. 4, after task 441 determines that the current and pending memory access requests involve different memory modules, task 443 delays and "queues" the precharge operation for the current access, i.e. the command that has already executed in tasks 410–416. In this way, the steps of masking and expediting timing may be processed more quickly, with the queued precharge being handled at a later time (i.e. at next performance of task 420).

A queued precharge command, however, cannot be performed while data from its corresponding memory access command is still being placed upon the data bus 228. Therefore, although not shown, a non-queued precharge command (tasks 426, 428) corresponding to a prior memory access command must be delayed when necessary to avoid interfering with data placed on the data bus 228 as a result of the prior command. In contrast, queued precharge commands need not be delayed in this manner, because the corresponding data have already entered and departed the data bus 228.

2. Masking Operations

After task 443, task 442 identifies an appropriate time for "masking" any exchange of data between the data bus 228 and the memory module 203–206 involved in the prior memory access. An important factor in achieving gapless data transfer is the "mask time", as mentioned above. If different memory modules 203–206 are involved in the current memory access request and the pending memory access request, measures such as "masking" can be taken to help avoid any potential conflict on the data bus 228. Specifically, by selectively decoupling or "masking" one memory module after completion of its data transfer operation, potential conflict can be prevented on the data bus 228 with a subsequent memory access operation. The mask time considers the length of the first data block and its time of placement on the data bus 228, and is calculated to occur precisely at the conclusion of the first memory access operation, i.e. when the first data block is scheduled to leave the data bus 228.

When query 444 determines that the mask time has arrived, the controller 202 in task 446 masks the exchange by triggering the DQM line of the memory module 203–206 involved in the first memory access operation. In the illustrated embodiment, this is performed by the DQM generator 226.

3. Early Command Initiation

After task 446, task 445 determines the earliest time at which the new memory access command may be placed upon the command bus 224 to successfully exchange the associated data over the data bus 228. This ensures the early initiation of the second memory access command on the command bus 224.

If a memory access command is placed upon the command bus 224 too early, however, it might result in placement of data on the data bus 228 before data associated with the prior memory access command has left the bus. Task 445 therefore identifies a "critical" time, prior to the departure of prior data from the data bus 228, at which the next memory command can be executed so that there is no gap between the adjacent blocks of data on the data bus 228. As mentioned above, this calculation considers various factors, such as the way in which the controller 202 and memory modules 203–206 process Read and Write commands, the avoidance of command and data bus conflict, the number of clock cycles of delay occurring between issuance of a Read command and placement of the requested data on the data bus 228 (if either memory access command is a Read command), and the like.

After task 445, query 449 determines whether the critical time has arrived. When the critical time does arrive, query 449 routes control via query 406 to tasks 410–416, which place the pending memory access command upon the command bus 224. As a result, data from the pending memory access operation will be placed upon the data bus 228 in rapid succession after data from the current memory access operation, essentially without "gaps."

Example: Read-Read

Figure 5:
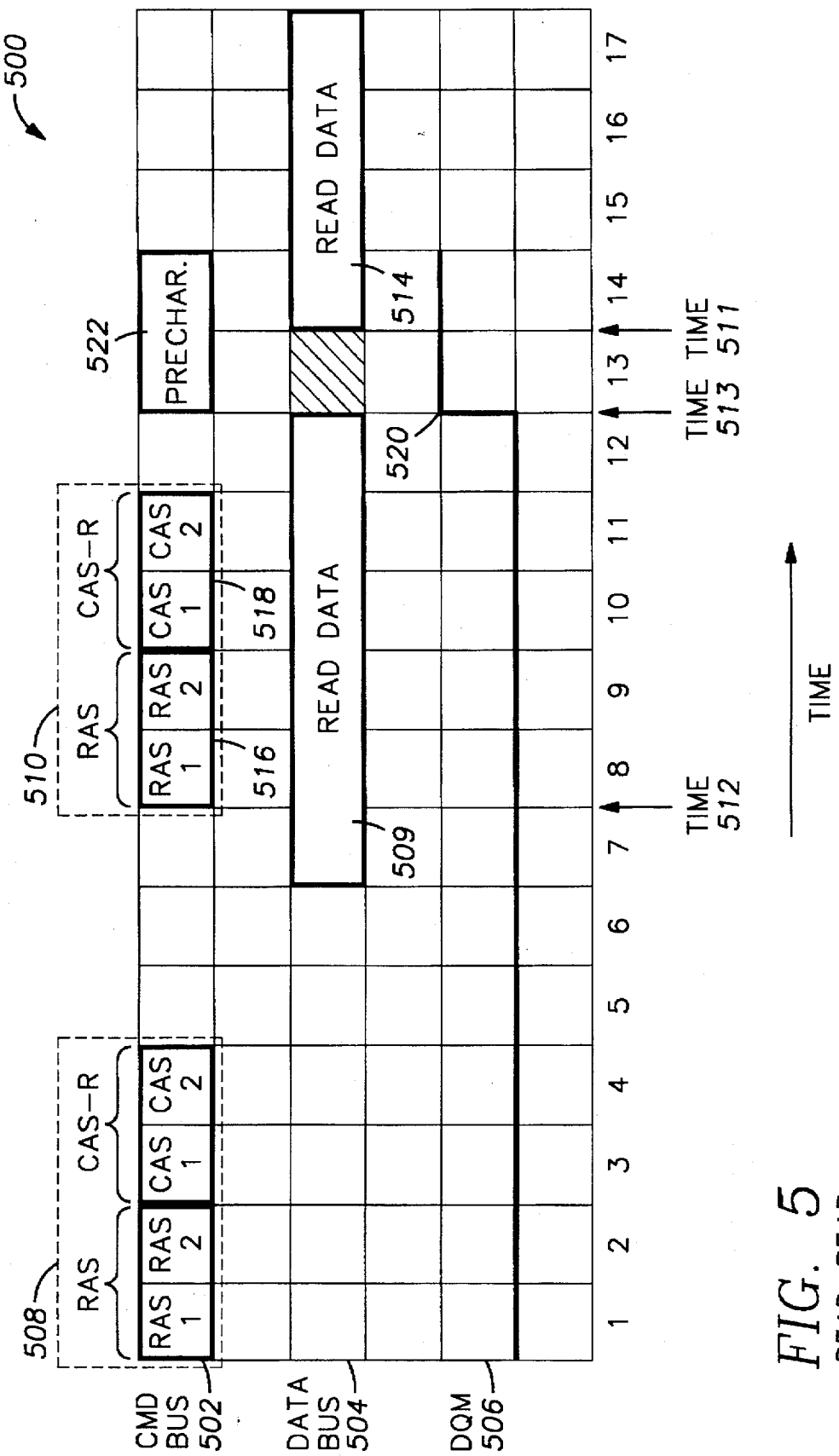
FIG. 5 is a timing diagram depicting a Read-Read sequence in accordance with the invention.
Figure 6:
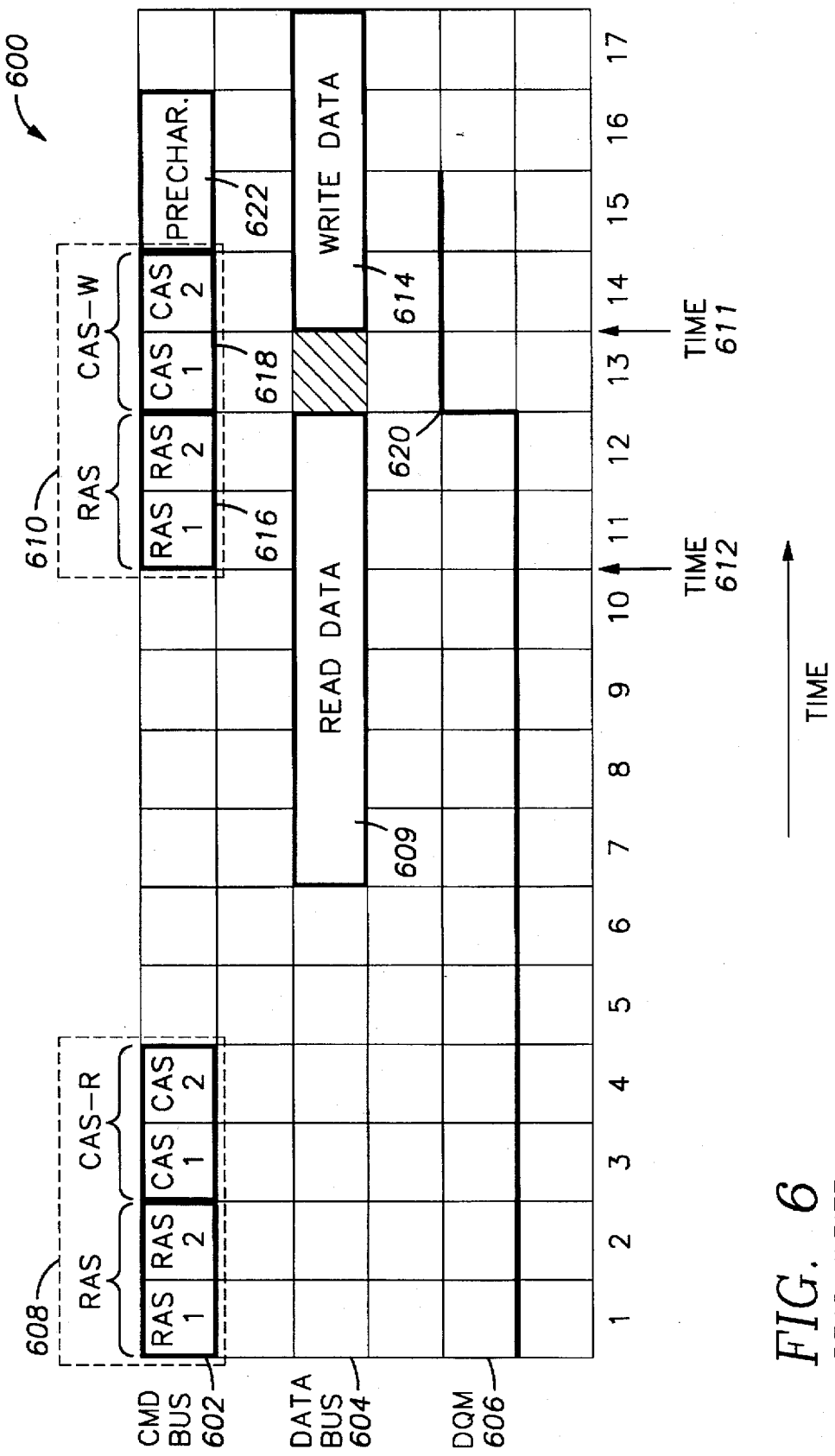
FIG. 6 is a timing diagram depicting a Read-Write sequence in accordance with the invention.
Figure 7:
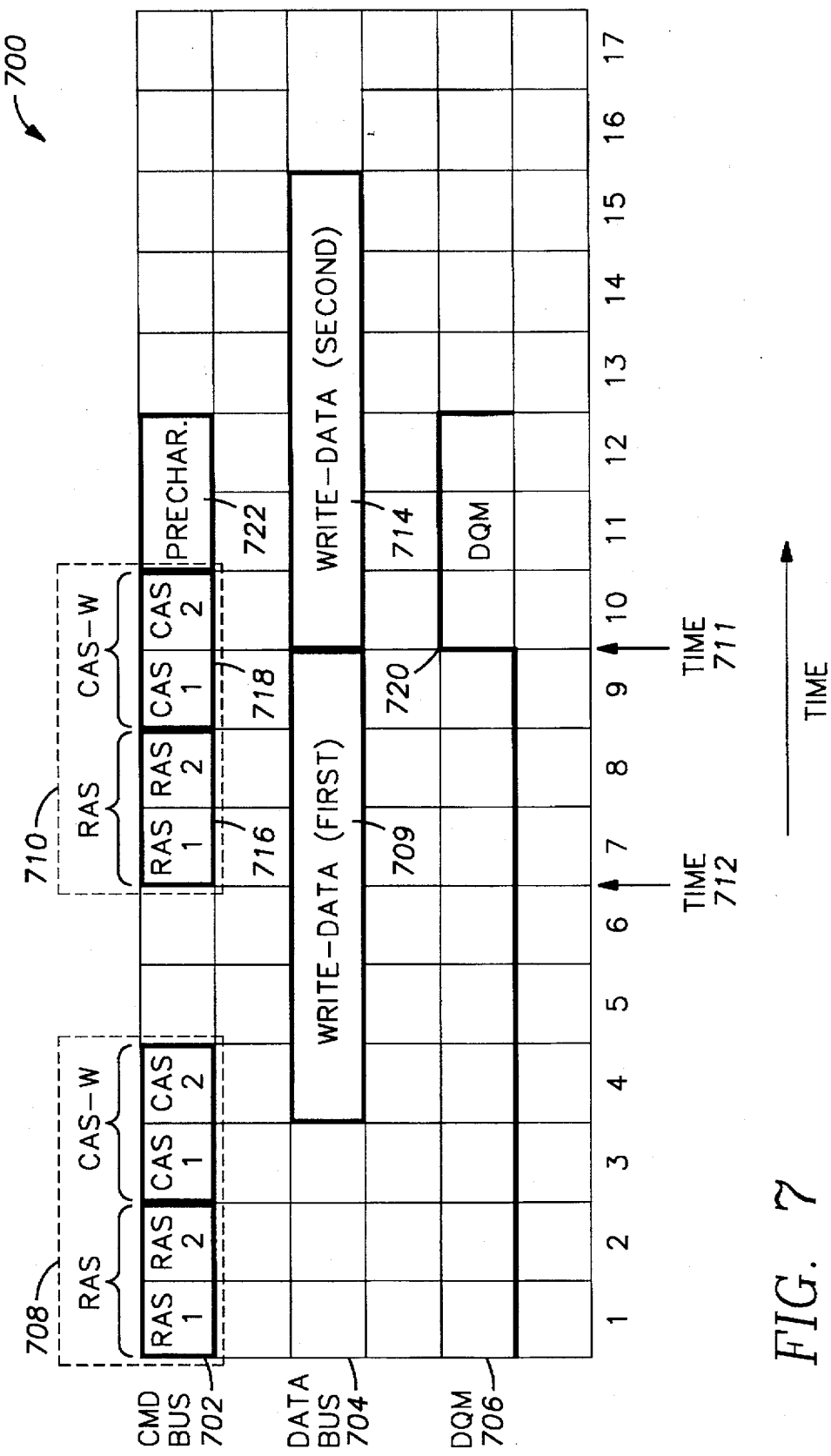
FIG. 7 is a timing diagram depicting a Write-Write sequence in accordance with the invention.
Figure 8:
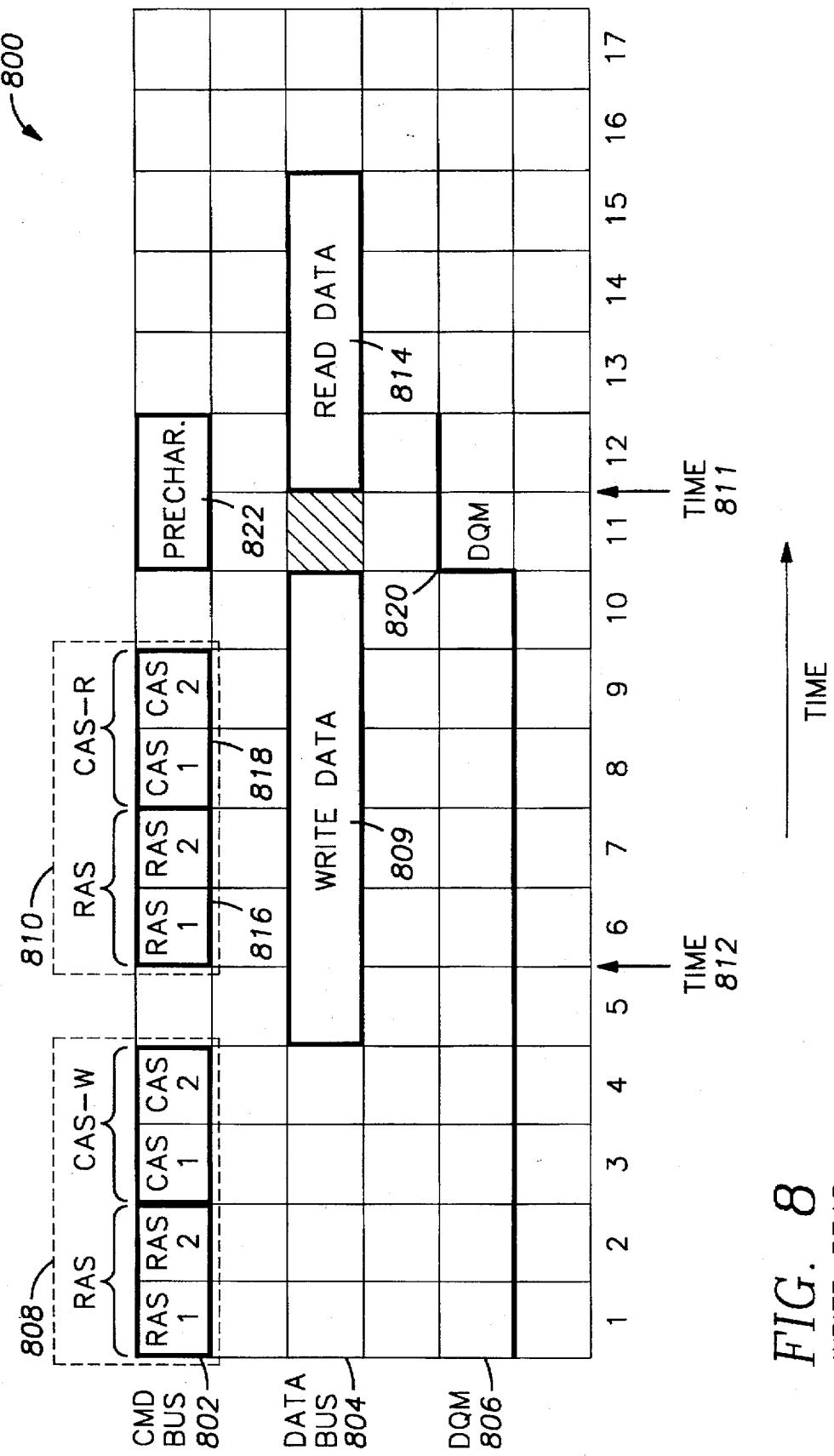
FIG. 8 is a timing diagram depicting a Write-Read sequence in accordance with the invention.

To further illustrate the operation of the routine 400, FIGS. 5–8 depict various timing diagrams showing the timing relationship of memory access commands and the presence of certain data on the data bus 228. In particular, FIG. 5 depicts a "Read-Read" sequence, i.e. a Read command followed by another Read command. FIG. 6 depicts a "Read-Write" sequence, i.e. a Read command followed by a Write command. FIG. 7 depicts a "Write-Write" sequence, i.e. a Write command followed by another Write command. FIG. 8 depicts a "Write-Read" sequence, i.e. a Write command followed by a Read command.

FIG. 5 shows a timing diagram 500. The rows 502, 504, and 506 represent the respective states of the command bus 224, data bus 228, and DQM generator 226 over time. Time progresses in FIG. 5 from left to right.

In this example, two memory access requests (not shown) are received, requesting the reading of data from memory modules 203 and 204, respectively. First, a Read command 508 is issued for access to data from the first memory module 203. The Read command 508 includes a two-cycle RAS signal and a two-cycle CAS signal. In the illustrated example, the Read command 508 requests the memory module 203 to place a 24 byte block 509 of Read data upon the data bus 228 during 6 clock cycles (i.e. 4 bytes per cycle). Issuance of the Read command 508 on the command bus 224 corresponds to tasks 410–416.

After the Read command 508 is complete, control proceeds to step 418. No precharge is pending from a previous memory access command; furthermore, since the second memory access request is awaiting, control proceeds through query 419 to query 441. Query 441 determines that the two memory access requests do not concern the same memory module. Thus, task 443 queues the precharge associated with the current memory access command (i.e. the first Read command), for later execution. Then, task 442 determines when to mask exchanges between the data bus 228 and the first memory module 203. This time is calculated to coincide with the end of the Read data 509, to effectively mask any exchange of data between the data bus 228 and the first module 203 (from which the Read data 509 originated), thereby preventing any data bus conflict with the next block of Read data. As shown by the DQM row 506, the masking is carried out in task 446 when the DQM generator 226 produces a high signal 520.

Next, task 445 determines that the Read data 514 resulting from the pending Read command 510 can appear on the data bus 228 no earlier than a time 511. Therefore, the time for placing the Read command 510 on the command bus 224 (i.e., the "critical time") is determined to be the time 512, considering the following:

1. The Read command 510 includes a two-cycle RAS command 516 and a two-cycle CAS command 518.
2. Placement of the Read data 514 on the data bus 228 is triggered by the second cycle of the CAS command 518, but occurs after a delay of two cycles.
3. The size of the data block 509 is 24 bytes, having a length of 6 clock cycles.
4. A one cycle high impedance cycle is required between adjacent data blocks when either one results from a Read command.

After task 445, query 449 awaits arrival of the critical time 512. At the critical time, the Read command 510 is initiated when query 449 advances through task 406 to tasks 410–416. With this timing, the Read data 514 retrieved by the second Read command 510 appears on the data bus 224 as soon as possible after the Read data 509 exits.

After tasks 410–416, query 418 determines that a precharge is pending, since a precharge corresponding to the earlier memory access command was previously queued in task 443. Therefore, task 420 places the two-cycle precharge command 522 upon the command bus 224, effectively precharging the first memory module 203. As shown in FIG. 5, this precharge command 522 is delayed until after data 509 from the first Read command 508 leaves the data bus 228, for reasons discussed above.

After the precharge command 522 is issued, having no more precharges pending and no more memory access requests pending, queries 418–419 route control to query 421. When query 421 determines that the second memory access operation is complete, tasks 426 and 426 place a two-cycle precharge command (not shown) upon the command bus 224 to clear the second memory module 204. With no other memory request pending, query 430 then routes control to task 402, where the idle mode is entered.

Example: Read-Write

FIG. 6 depicts a timing diagram 600 representing a "Read-Write" sequence, i.e. a Read command followed by a Write command. The rows 602, 604, and 606 represent the respective states of the command bus 224, data bus 228, and DQM generator 226 over time. Time progresses in FIG. 6 from left to right.

In this example, two memory access requests (not shown) are received, requesting the reading of data from a first memory module 203 and writing of data to a second memory module 204. Accordingly, a Read command 608 is first issued. The Read command 608 includes a two-cycle RAS signal and a two-cycle CAS signal. In the illustrated example, the Read command 608 requests the memory module 203 to place a 24 byte block 609 of Read data upon the data bus 228 during 6 clock cycles (i.e. 4 bytes per cycle). The Read command 608 corresponds to tasks 410–416.

After the Read command 608 is complete, control proceeds to step 418. No precharge is pending from a previous memory command; however, since the second memory access request is awaiting, control proceeds through query 419 to query 441. Query 441 determines that the two memory access requests do not concern the same memory module. Thus, task 443 queues the precharge associated with the current memory access command (i.e. the Read command), for later execution. Then, task 442 proceeds to determine when to mask exchanges between the data bus 228 and the first memory module 203. This time is calculated to coincide with the end of the Read data 609. This effectively masks any exchange of data between the data bus 228 and the first module 203 (from which the Read data 609 originated), to prevent any data bus conflict with the next block of data. As shown by the DQM row 606, the masking is carried out in task 446 when the DQM generator 226 produces a high signal 620.

Next, task 445 determines that Write data 614 resulting from the Write command 610 cannot be placed upon the data bus 228 any earlier than a time 611. Hence, the time for placing the Write command 610 on the command bus 224 (i.e., the "critical time") is determined to be the time 612, considering the following:

1. The Write command 610 includes a two-cycle RAS command 616 and a two-cycle CAS command 618.
2. Placement of the Write data 614 on the data bus 228 is triggered by the second cycle of the CAS command 618, without delay.
3. The size of the data block 609 is 24 bytes, having a length of 6 clock cycles.
4. A one cycle high impedance period is required between adjacent data blocks when either one results from a Read command.

After task 445, query 449 awaits arrival of the critical time 612. At the critical time, the Write command 610 is initiated after query 449 advances to tasks 410–416 via query 406. With this timing, the Write data 614 associated with the Write command 610 is placed on the data bus 224 as soon as possible after the Read data 609 exits.

After tasks 410–416, query 418 determines that a precharge is pending, since a precharge corresponding to the Read command was previously queued in task 443. Therefore, task 420 places the two-cycle precharge command 622 upon the command bus 224, effectively precharging the first memory module 203. As shown in FIG. 6, this precharge command 622 need not be delayed, since data 609 from the first memory access command has already left the data bus 228 by the time the second cycle of the CAS command 618 occurs in task 416.

After the precharge command 622 is issued, having no more precharges pending and no more memory access requests pending, queries 418–419 route control to query 421. When query 421 determines that the second memory access operation is complete, tasks 426 and 428 place a two-cycle precharge command (not shown) upon the command bus 224 to clear the second memory module 204. With no other memory request pending, query 430 then routes control to task 402, where the idle mode is entered.

Example: Write-Write

FIG. 7 contains a timing diagram 700 representing a "Write-Write" sequence, i.e. a Write command followed by another Write command. The rows 702, 704, and 706 represent the respective states of the command bus 224, data bus 228, and DQM generator 226 over time. Time progresses in FIG. 7 from left to right.

In this example, two memory access requests (not shown) are received, requesting the writing of data to memory modules 203 and 204, respectively. First, a Write command 708 is issued to store data in the first memory module 203. The Write command 708 includes a two-cycle RAS signal and a two-cycle CAS signal. In the illustrated example, the Write command 708 requests the memory module 203 to place a 24 byte block 709 of Read data upon the data bus 228 during 6 clock cycles (i.e. 4 bytes per cycle). Issuance of the Write command 708 on the command bus 224 corresponds to tasks 410–416.

After the Write command 708 is complete, control proceeds to step 418. No precharge is pending from a previous memory access command; furthermore, since the second memory access request is awaiting, control proceeds through query 419 to query 441. Query 441 determines that the two memory access requests do not concern the same memory module. Thus, task 443 queues the precharge associated with the current memory access command, for later execution. Then, task 442 determines when to mask exchanges between the data bus 228 and the first memory module 203. This time is calculated to coincide with the end of the Write data 709, to effectively mask any exchange of data between the data bus 228 and the first module 203 (to which the Write data 709 is being written), thereby preventing any data bus conflict with the next block of Write data. As shown by the DQM row 706, the masking is carried out in task 446 when the DQM generator 226 produces a high signal 720.

Next, task 445 determines that Write data 714 for the pending Write command 710 cannot be placed on the data bus 228 any earlier than a time 711. Hence, the time for placing the Write command 710 on the command bus 224 (i.e., the "critical time") is determined to be the time 712, considering the following:

1. The Write command 710 includes a two-cycle RAS command 716 and a two-cycle CAS command 718.
2. Placement of the Write data 714 on the data bus 228 occurs at the second cycle of the CAS command 718, without any intervening delay.
3. The size of the data block 709 is 24 bytes, having a length of 6 clock cycles.

After task 445, query 449 awaits arrival of the critical time 712. At the critical time, the Write command 710 is initiated when query 449 advances through task 409 to tasks 410–416. With this timing, the Write data 714 of the second Write command 710 can appear on the data bus 224 as soon as possible after the first Write data 709 exits.

After tasks 410–416, query 418 determines that a precharge is pending, since a precharge corresponding to the first Write command was previously queued in task 443. Therefore, task 420 places the two-cycle precharge command 722 upon the command bus 224, effectively precharging the first memory module 203. As shown in FIG. 5, this precharge command 722 need not be delayed, since the Write data 709 has already departed the data bus 228 by the time the second cycle of the CAS command 718 occurs in task 416.

After the precharge command 722 is issued, having no more precharges pending and no more memory access requests pending, queries 418–419 route control to query 421. When query 421 determines that the second memory access operation is complete, tasks 426 and 428 place a two-cycle precharge command (not shown) upon the command bus 224 to clear the second memory module 204. With no other memory request pending, query 430 then routes control to task 402, where the idle mode is entered.

Example: Write-Read

FIG. 8 contains a timing diagram 800 representing a "Write-Read" sequence, i.e. a Write command followed by a Read command. The rows 802, 804, and 806 represent the respective states of the command bus 224, data bus 228, and DQM generator 226 over time. Time progresses in FIG. 8 from left to right.

In this example, two memory access requests (not shown) are received, requesting the writing of data to a first memory module 203, and reading of data from a second memory module 204. First, a Write command 808 is issued to store data in the first memory module 203. The Write command 808 includes a two-cycle RAS signal and a two-cycle CAS signal. In the illustrated example, the Write command 808 requests the memory module 203 to place a 24 byte block 809 of Read data upon the data bus 228 during 6 clock cycles (i.e. 4 bytes per cycle). Issuance of the Write command 808 on the command bus 224 corresponds to tasks 410–416.

After the Write command 808 is complete, control proceeds through step 418. No precharge is pending from a previous memory access command; furthermore, since the second memory access request is awaiting, control proceeds through query 419 to query 441. Query 441 determines that the two memory access requests do not concern the same memory module. Thus, task 443 queues the precharge associated with the current memory access command (i.e. the Write command), for later execution. Then, task 442 determines when to mask exchanges between the data bus 228 and the first memory module 203. This time is calculated to coincide with the end of the Write data 809, to effectively mask any exchange of data between the data bus 228 and the first module 203 (to which the Write data 809 is written), thereby preventing any data bus conflict with the next block of data. As shown by the DQM row 806, the masking is carried out in task 446 when the DQM generator 226 produces a high signal 820.

Next, task 445 determines that Read data 814 resulting from the pending Read command 810 can appear on the data bus 228 no earlier than a time 811. Hence, the time for placing the Read command 810 on the command bus 224 (i.e., the "critical time") is determined to be the time 812, considering the following:

1. The Write command 810 includes a 2-cycle RAS command 816 and a 2-cycle CAS command 818.
2. Placement of the Read data 814 on the data bus 228 is triggered by the second cycle of the CAS command 818, but occurs after a delay of two cycles.
3. The size of the data block 809 is 24 bytes, having a length of 6 clock cycles.
4. A one cycle high impedance cycle is required between adjacent data blocks when either one results from a Read command.

After task 445, query 449 awaits arrival of the critical time 812. At the critical time 812, the Read command 810 is initiated when query 449 advances through task 409 to tasks 410–416. With this timing, the Read data 814 retrieved by the second Read command 810 appears on the data bus 224 as soon as possible after the Write data 809 exits.

After tasks 410–416, query 418 determines that a precharge is pending, since a precharge corresponding to the earlier memory access command (i.e. the Write command 808) was previously queued in task 443. Therefore, task 420 places the two-cycle precharge command 822 upon the command bus 224, effectively precharging the first memory module 203. As shown in FIG. 8, this precharge command 822 is delayed until after data 809 from the Write command 808 leaves the data bus 228, for reasons discussed above.

After the precharge command 822 is issued, having no more precharges pending and no more memory access requests pending, queries 418–419 route control to query 421. When query 421 determines that the Read operation is complete, tasks 426 and 428 place a two-cycle precharge command (not shown) upon the command bus 224 to clear the second memory module 204. With no other memory request pending, query 430 then routes control to task 402, where the idle mode is entered.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for operating a data bus to exchange data with an S-DRAM assembly that includes multiple memory units, where said S-DRAM assembly is coupled to said data bus and to a command bus, said method comprising:

receiving a first memory access request to exchange a first data string having a first length with a first one of the memory units;

issuing on the command bus a first memory access command to execute the first memory access request;

placing the first data string upon the data bus in response to the first memory access command;

prior to departure of the first data string from the data bus, receiving a second memory access request to exchange a second data string with a second one of the memory units;

in response to the second memory access request, determining a first time to place a second memory access command on the command bus to initiate placement of the second data string upon the data bus at a second time defined by a first delay following departure of the first data string from the data bus; and placing the second memory access command upon the command bus at the first time.

2. The method of claim 1, the first delay being substantially equal to zero.

3. The method of claim 1, the determining of the first time including using the first length, data bus availability, and any predetermined delay in placement of the first data string onto the data bus to determine the first time such that the first delay is minimized.

4. The method of claim 1, further comprising using input including the first length to identify a third time at which the first data string departs the data bus and, following a second delay from the third time, preventing any exchange of data between the first memory unit and the data bus for a predetermined time period.

5. The method of claim 4, the second delay being substantially equal to zero.

6. The method of claim 1, the issuing of the first memory access command including issuing on the command bus a Read command to read the first data string from the first memory unit.

7. The method of claim 6, wherein the Read command includes a RAS signal to identify a row in which the first data string is stored in the first memory unit, a CAS signal to identify a column in which the first data string is stored in the first memory unit, and a precharge signal following the RAS and CAS signals to clear the first memory unit.

8. The method of claim 1, the issuing of the first memory access command including issuing on the command bus a Write command to write the first data string to the first memory unit.

9. The method of claim 8, wherein the Write command includes a RAS signal to identify a row for storage of the first data string in the first memory unit, a CAS signal to identify a column for storage of the first data string in the first memory unit, and a precharge signal following the RAS and CAS signals to clear the first memory unit.

10. The method of claim 1, the placing of the second memory access command comprising placing upon the command bus a Read command to read the second data string from the second memory unit.

11. The method of claim 10, wherein the Read command includes a RAS signal to identify a row in which the second data string is stored in the second memory unit, a CAS signal to identify a column in which the second data string is stored in the second memory unit, and a precharge signal following the RAS and CAS signals to clear the second memory unit.

12. The method of claim 1, the placing of the second memory access command comprising placing upon the command bus a Write command to write the second data string to the second memory unit.

13. The method of claim 12, wherein the Write command includes a RAS signal to identify a row for storage of the second data string in the second memory unit, a CAS signal to identify a column for storage of the second data string in the second memory unit, and a precharge signal following the RAS and CAS signals to clear the second memory unit.

14. The method of claim 1, wherein the first length comprises a byte count.

15. The method of claim 3, wherein the predetermined delay comprises a time delay occurring between receipt of a Read command by the command bus and placement of the first data string onto the data bus by an appropriate memory unit in response to the Read command.

16. The method of claim 1, further comprising receiving a request to refresh the S-DRAM and then refreshing the S-DRAM.

17. The method of claim 16, wherein the refreshing of the S-DRAM is performed after the issuing of the first memory access command.

18. The method of claim 16, wherein the request comprises a high priority refresh request and the refreshing of the S-DRAM is performed before the issuing of the first memory access command.

19. The method of claim 1, further comprising determining whether the first and second memory units are different, and if so preventing issuance of a precharge command for the first memory unit until placement of the second memory access command upon the command bus, and then issuing the prevented precharge command in the command bus.

20. The method of claim 19, further comprising issuing a second precharge command to the second memory unit via the command bus following issuance of the prevented precharge command.

21. The method of claim 19, further comprising further delaying the prevented precharge command until departure of the first data string from the data bus.

22. The method of claim 20, further comprising delaying the second precharge command until departure of the second data string from the data bus.

23. A memory circuit, comprising:

an S-DRAM assembly that includes multiple memory units;

a data bus coupled to the S-DRAM assembly;

a command bus coupled to the S-DRAM assembly;

a controller, coupled to the data bus and the command bus, for managing access of the S-DRAM assembly by:
   receiving a first memory access request to exchange a first data string having a first length with a first one of the memory units;
   issuing on the command bus a first memory access command to execute the first memory access request;
   prior to departure of the first data string from the data bus, receiving a second memory access request to exchange a second data string with a second one of the memory units;
   in response to the second memory access request, determining a first time to place a second memory access command upon the command bus to initiate placement of the second data string upon the data bus at a second time defined by a first delay following departure of the first data string from the data bus; and
   placing the second memory access command upon the command bus at the first time.

24. The memory circuit of claim 23, wherein the controller further manages access of the S-DRAM assembly by using input including the first length to identify a third time at which the first data string departs the data bus and, following a second delay from the third time, preventing any exchange of data between the first memory unit and the data bus for a predetermined time period.

25. The memory circuit of claim 23, wherein the controller comprises an ASIC.

26. The memory circuit of claim 23, wherein the controller includes a processor and a series of microcoded instructions executable by the processor.

27. The memory circuit of claim 23, wherein the controller determines the first time considering the first length, data bus availability, and any predetermined delay in placement in the first data string onto the data bus such that the first delay is minimized.

28. A method of exchanging data with multiple S-DRAM memory units using a data bus and a command bus coupled to the S-DRAM memory units, said method comprising:
   receiving a first memory access request to exchange a first data string having a first length with a first one of the memory units;
   issuing on the command bus a first memory access command to execute the first memory access request;
   placing the first data string upon the data bus in response to the first memory access command;
   prior to departure of the first data string from the data bus, receiving a second memory access request to exchange a second data string with a second one of the memory units;
   in response to the second memory access request, predicting a first time at which placement of a second memory access command on the command bus would initiate placement of the second data string upon the data bus substantially immediately upon departure of the first data string from the data bus; and
   placing the second memory access command upon the command bus at the first time.

29. The method of claim 28, further comprising delaying placement of the second memory access command upon the command bus a predetermined period with respect to departure of the first data string from the data bus.

30. The method of claim 28, the predicting of the first time including determining the first time using input including the first length, data bus availability, and any predetermined delay in placement of the first data string onto the data bus.

31. The method of claim 28, further including using input including the first length to identify a time at which the first data string departs the data bus and substantially immediately upon the identified time preventing any exchange of data between the first memory unit and the data bus for a predetermined time period.

32. The method of claim 28, wherein the second memory access request is received prior to placement of the first data string upon the data bus.

33. The method of claim 28, wherein the second memory access request is received prior to issuance of the first memory access command on the command bus.

34. The method of claim 28, further comprising, between the issuance of the first memory access command and the placement of the second memory access command, issuing via the command bus a precharge command to precharge the first memory unit.

35. The method of claim 28, further comprising:
   in response to the second memory access request, determining whether the first and second memory units are different, and if so preventing issuance of any precharge commands for precharging of the first memory unit; and
   after placing the second memory access command upon the command bus, if the first and second memory units are different, issuing a precharge command on the command bus to precharge the first memory unit.

36. A method of exchanging data with multiple S-DRAM memory units using a data bus and a command bus coupled to the S-DRAM memory units, said method comprising:
   receiving a first memory access request to exchange a first data string having a first length with a first one of the memory units;
   issuing on the command bus a first memory access command to execute the first memory access request;
   placing the first data string upon the data bus in response to the first memory access command;
   prior to departure of the first data string from the data bus, receiving a second memory access request to exchange a second data string with a second one of the memory units;
   in response to the second memory access request, determining whether the first and second memory units are different, and if so preventing issuance of any precharge commands for precharging of the first memory unit; and
   placing the second memory access command upon the command bus at a selected time and then, if the first and second memory units are different, issuing the delayed precharge command to precharge the first memory unit.

37. The method of claim 36, further comprising:
   in response to the second memory access request, predicting a first time at which placement of a second memory access command on the command would initiate placement of the second data string upon the data bus substantially immediately upon departure of the first data string from the data bus; and
   wherein the placing of the second memory access command upon the command bus occurs at the first time.

* * * * *